United States Patent
Miura

(10) Patent No.: US 8,359,371 B2
(45) Date of Patent: Jan. 22, 2013

(54) INPUT CANDIDATE PROVIDING DEVICE, INPUT CANDIDATE PROVIDING SYSTEM, INPUT CANDIDATE PROVIDING METHOD, AND INPUT CANDIDATE PROVIDING PROGRAM

(75) Inventor: Yuki Miura, Asahikawa (JP)

(73) Assignee: Access Co., Ltd., Tokyo (JP)

( * ) Notice: Subject to any disclaimer, the term of this patent is extended or adjusted under 35 U.S.C. 154(b) by 722 days.

(21) Appl. No.: 12/597,737

(22) PCT Filed: Apr. 25, 2008

(86) PCT No.: PCT/JP2008/058133
§ 371 (c)(1),
(2), (4) Date: Oct. 26, 2009

(87) PCT Pub. No.: WO2008/136439
PCT Pub. Date: Nov. 13, 2008

(65) Prior Publication Data
US 2010/0064030 A1 Mar. 11, 2010

(30) Foreign Application Priority Data
Apr. 26, 2007 (JP) .................................. 2007-116611

(51) Int. Cl.
*G06F 15/16* (2006.01)
*G06F 17/28* (2006.01)
(52) U.S. Cl. ........................................ 709/219; 715/221
(58) Field of Classification Search .................. 709/219; 715/221
See application file for complete search history.

(56) References Cited

U.S. PATENT DOCUMENTS

| 5,845,300 | A  | * | 12/1998 | Comer et al. | 715/203 |
| 6,208,339 | B1 | * | 3/2001  | Atlas et al. | 715/780 |
| 7,970,758 | B2 | * | 6/2011  | Kinder       | 707/722 |
| 2002/0019731 | A1 |   | 2/2002 | Masui et al. | |

(Continued)

FOREIGN PATENT DOCUMENTS

CN 1624641 A 6/2005
(Continued)

OTHER PUBLICATIONS

Office Action received for Chinese Patent Application No. 200880013719.1, issued on May 31, 2012, 10 pages (6 pages of English translation and 4 pages of Office Action).

(Continued)

*Primary Examiner* — Larry Donaghue
(74) *Attorney, Agent, or Firm* — Morrison & Foerster LLP

(57) ABSTRACT

A method for providing input candidates with respect to a form which is embedded in a content to be displayed, the method comprising a parsing result obtaining step of requesting and obtaining a result of parsing performed by a parsing function which parses a content; an analyzing step of passing the result of the parsing to an analyzing function which analyzes a context of the content, letting the analyzing function execute analysis, and obtaining a result of the analysis from the analyzing function; an input candidate determining step of passing the result of the parsing to an input candidate determining function which determines input candidates, letting the input candidate determining function determine the input candidates, and obtaining the input candidates from the input candidate determining function; and an input candidate displaying step of displaying the obtained input candidates on a display as the input candidates with respect to the form.

29 Claims, 7 Drawing Sheets

U.S. PATENT DOCUMENTS

| | | |
|---|---|---|
| 2004/0070567 A1 | 4/2004 | Longe et al. |
| 2006/0059142 A1* | 3/2006 | Zvinyatskovsky et al. ....... 707/5 |
| 2008/0062136 A1 | 3/2008 | Nakamura et al. |

FOREIGN PATENT DOCUMENTS

| | | |
|---|---|---|
| JP | 2000-148642 A | 5/2000 |
| JP | 2000-259733 A | 9/2000 |
| JP | 2001-188641 A | 7/2001 |
| JP | 2001-325252 A | 11/2001 |
| JP | 2005-165826 A | 6/2005 |
| JP | 2005-275488 A | 10/2005 |
| JP | 2007-025844 A | 2/2007 |
| WO | WO-2007-007573 A1 | 1/2007 |

OTHER PUBLICATIONS

International Search Report mailed on Aug. 5, 2008, for PCT Application No. PCT/JP2008/058133 filed Apr. 25, 2008, 4 pages, including English translation.

* cited by examiner

INPUT CANDIDATE PROVIDING DEVICE, INPUT CANDIDATE PROVIDING SYSTEM, INPUT CANDIDATE PROVIDING METHOD, AND INPUT CANDIDATE PROVIDING PROGRAM

TECHNICAL FIELD

The present invention relates to an input candidate providing device, an input candidate providing method, and an input candidate providing program for providing an input candidate with respect to a form which is embedded in a content to be displayed. Also, the present invention relates to an input candidate providing system in which an input candidate providing device and a server cooperate together to function and provide an input candidate with respect to a form which is embedded in a content to be displayed.

BACKGROUND OF THE INVENTION

Information browsing software for browsing information on a network (hereinafter, written as "browser") is widely known and provided for practical use. In a browser a function to parse information on a network (for example, a Web page which is a document described in a markup language such as an HTML (Hyper Text Markup Language)) and to perform rendering based on the result of the parsing is implemented. A user can browse an intended Web page on a browser by specifying a URI (Uniform Resource Identifier).

Web pages which can be browsed on a browser include, for example, a Web page in which a form to input information, about which the user wants to inquire, or key words, with which a user want to perform a search, etc., is embedded. When information is input to a form through a user operation on such a Web page, in response to the input, a CGI (Common Gateway Interface) program is executed on a Web server based on the information input to the form. Then, the result obtained by the processing with the CGI program is output in an HTML and transmitted to a client (a browser). In this manner, a user can browse dynamic information corresponding to the input to the form. For example, Japanese Patent Provisional Publication No. 2001-188641 (hereinafter, referred to as "patent document 1") discloses an embodiment of a system which supplies dynamic information to a client by using a form.

DISCLOSURE OF THE INVENTION

According to the patent document 1, for example, when form input is made, a balloon help or a related Web page is displayed and supplied to a user as an assistant. Further, for example, autocomplete of IE (Internet Explorer) can be considered as another embodiment of such a form assistance. According to this example, autocomplete history is presented as input candidates to a user through a pull-down menu.

However, the example of the patent document 1 or the example of the autocomplete history is not sufficient to supply input candidates with which a user is satisfied. For example, in the example of the autocomplete history, an input candidate is always limited to the information which has been input by a user in the past. For example, in the example of the autocomplete history, input candidates are always limited to the information which has been input by a user in the past. It is beneficial to supply a history as input candidates to the same form. However, if a history is supplied as input candidates when input is made for the first time, an inconvenience can arise in that all of the input candidates are off-centered.

Therefore, in consideration of the above described circumstances, it is an object of the invention to provide an input candidate providing device, an input candidate providing system, an input candidate providing method, and an input candidate providing program which can supply appropriate candidates to a form.

With an embodiment of the invention, a method for providing input candidates with respect to a form which is embedded in a content to be displayed is provided. The method includes a parsing result obtaining step of requesting and obtaining a result of parsing performed by a parsing function which parses a content, an analyzing step of passing the result of the parsing to an analyzing function which analyzes a context of the content, letting the analyzing function execute analysis, and obtaining a result of the analysis from the analyzing function, an input candidate determining step of passing the result of the analysis to an input candidate determining function which determines input candidates, letting the input candidate determining function determine the input candidates, and obtaining the input candidates from the input candidate determining function, and an input candidate displaying step of displaying the obtained input candidates on a display as the input candidates with respect to the form.

With an embodiment of the invention, an input candidate providing device for providing input candidates with respect to a form embedded in a content to be displayed is provided. The input candidate providing device includes a content retrieving means that retrieves a content from inside or outside of the input candidate providing device, a parsing means that parses the retrieved content, an analyzing means that analyzes a context of the content based on the parsing result, a storing means that stores information about input candidates which is obtained from an external device, an input candidate determining means that determines input candidates from the storing means based on the analyzing result, and an input candidate displaying means that displays the determined input candidates as the input candidates for the form.

With an embodiment of the invention, an input candidate providing device which is able to communicate with a server device, wherein the server device is able to output input candidates for a content based on context information of the content, is provided. The input candidate providing device includes a content retrieving means that retrieves a content from inside or outside of the input candidate providing device, a parsing means that parses the retrieved content, an analyzing means that analyzes a context of the content based on the parsing result, a client's side transmitting means that transmits a request for obtaining input candidates and the analyzing result to the server device, a client's side receiving means that receives the input candidates from the server device as a response to the request, and a displaying means that displays the received input candidates as the input candidates for the form.

With an embodiment of the invention, an input candidate providing device which is able to communicate with a server device, wherein the server device outputs input candidates for a content based on a parsing result of the content, is provided. The input candidate providing device includes a content retrieving means that retrieves a content from inside or outside of the input candidate providing device, a parsing means that parses the retrieved content, a client's side transmitting means that transmits a request for obtaining input candidates and the parsing result to the server device, a client's side receiving means that receives the input candidates from the server device as a response to the request, and an input candidate displaying means that displays the received input candidates as the input candidates for the form.

With an embodiment of the invention, an input candidate providing system having the input candidate providing device according to any of the above input candidate providing devices and a server device is provided. The server device is able to communicate with the input candidate providing device, the server device includes a server's side receiving means that receives an analyzing result of a content and a request for obtaining input candidates from the input candidate providing device, a storing means that stores information about input candidates, an input candidate determining means that determines input candidates from the storing means based on the analyzing result, in accordance with the request, and a server's side transmitting means that transmits the determined input candidates to the input candidate providing device as a response to the request.

With an embodiment of the invention, an input candidate providing system, in which a client device and a server device cooperate to provide input candidates for a form embedded in a content, is provided. The client device and the server device are able to communicate with each other, and the client device includes a client's side content retrieving means that retrieves a content from inside or outside of the client device, a parsing means that parses the retrieved content, a form determining means that determines whether the content includes a form or not based on the parsing result, and an address notifying means that notifies a storage address of the content to the server device when the form determining means determines that the content includes a form, and the server device includes a server's side content retrieving means that retrieves the content by accessing the notified storage address, an analyzing means that parses the retrieved content and analyzes context information of the content based on the analyzing result, an input candidate determining means that determines input candidates based on the analyzing result, and a transmitting means that transmits the determined input candidates to the client device, and the client device further includes a receiving means that receives the input candidates from the server device, and a displaying means that displays the received input candidates as the input candidates for the form.

With an embodiment of the invention, an input candidate providing program for letting a computer execute the input candidate providing method according to any of the above methods.

With an embodiment of the invention, an input candidate providing program for a computer, wherein the computer is able to communicate with a server device so as to provide input candidates for a form embedded in a content to be displayed, and the server device outputs input candidates for the content based on context information of the content, is provided. The input candidate providing program is for letting the computer execute as a parsing means that parses a content, an analyzing means that analyzes a context of the content based on the parsing result, a client's side transmitting means that transmits the analyzing result and a request for obtaining input candidates to the server device, a client's side receiving means that receives the input candidates from the server device as a response to the request, and an input candidate displaying means that displays the received input candidates as the input candidates for the form.

With an embodiment of the invention, an input candidate providing program for a computer, wherein the computer is able to communicate with a server device so as to provide input candidates for a form embedded in a content to be displayed, and the server device outputs input candidates for the content based on a result of parsing of the content, is provided. The input candidate providing program is for letting the computer execute as a parsing means that parses a content, a client's side transmitting means that transmits the result of the parsing and a request for obtaining input candidates to the server device, a client's side receiving means that receives the input candidates from the server device as a response to the request, and an input candidate displaying means that displays the received input candidates as the input candidates for the form.

As described above, with embodiments of the invention, input candidate providing devices, input candidate providing systems, input candidate providing methods, and input candidate providing programs are provided which are advantageous for providing suitable input candidates, which are consistent with a context of a content, to a form.

BEST MODE FOR CARRYING OUT THE INVENTION

In the following, embodiments according to the present invention will be described with reference to the accompanying drawings.

First, terms used in this specification are defined.
Network

Various types of communications networks including a mobile communications network of a mobile communication operator, an intranet, and the Internet.
Content A group of pieces of information transmitted through a network or stored in a terminal, including video information, audio information, text information, a worksheet information, or a combination thereof which are browsed by a user.
Web Content A form of a content which is a group of pieces of information transmitted through a network.
Web Page A form of a Web content. The whole contents to be displayed when a user designates a URI (Uniform Resource Identifier). Namely, the whole contents which can be displayed through scrolling an image on a display. Further, a Web page is not limited to a Web content which can be browsed online, but also includes a Web content which can be browsed offline. Web pages which can be browsed offline include, for example, a Web page which has been transmitted through the Internet and cached by a browser, or a Web page which has been stored in a local folder of a terminal device in mht form, etc. A Web page includes various types of data (Web page data), for example, an HTML document, an XHTML document, an image file, and audio data, etc.

According to the above definitions, contents include Web contents, and Web contents include Web pages.

First Embodiment

Figure 1:
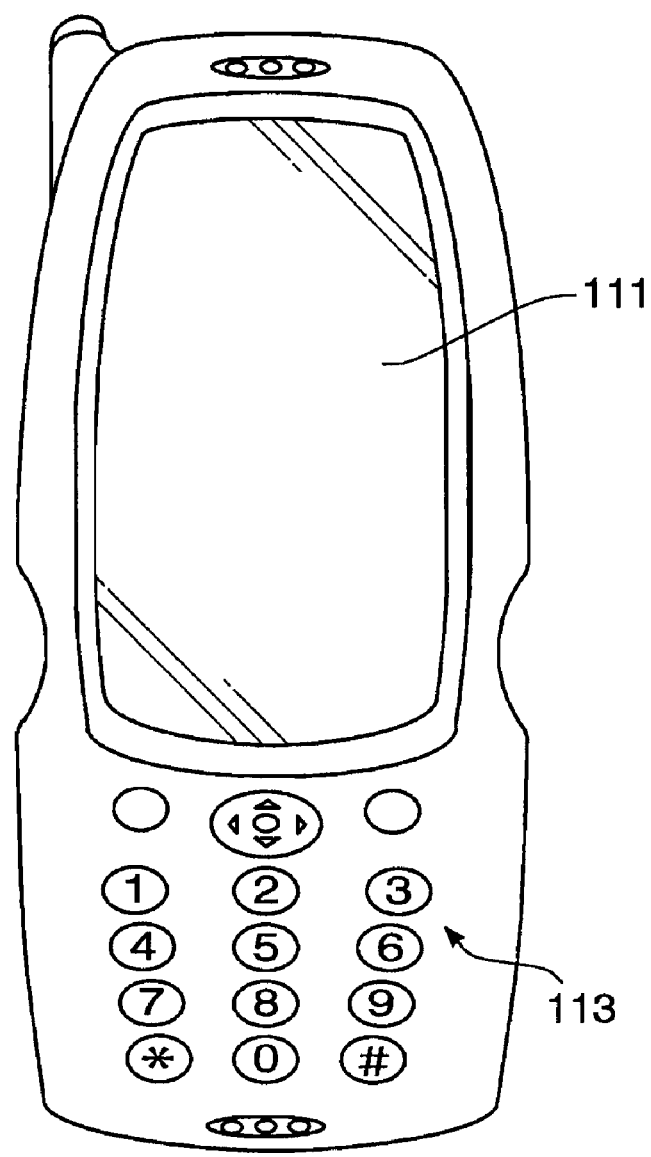
FIG. 1 illustrates an outer appearance of a terminal device according to a first embodiment of the invention.
Figure 2:
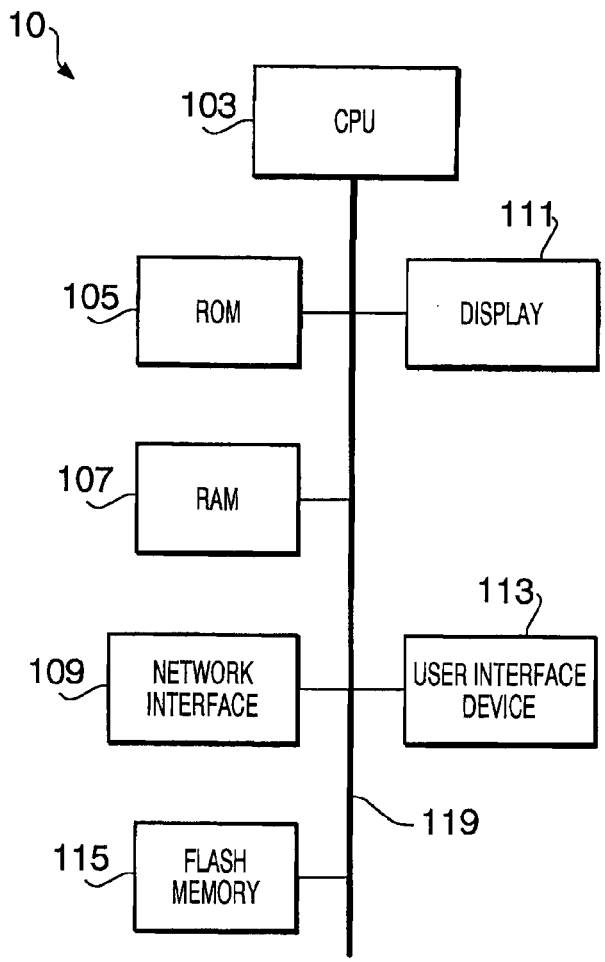
FIG. 2 is a block diagram illustrating a configuration of the terminal device according to a first embodiment of the invention.

FIG. 1 is a diagram illustrating an external view of a terminal device 10 according to a first embodiment of the invention. FIG. 2 is a block diagram illustrating architecture of the terminal device 10 according to the first embodiment of the invention. In the first embodiment, the terminal device 10 is a mobile telephone, but in another embodiment, as a terminal device, various types of devices can be considered, such as a desktop PC, a laptop PC, a PDA, a mobile telephone, a PHS (Personal Handy Phone System), or a mobile game device, for example.

The terminal device 10 includes a CPU 103 which integrally controls the entirety of the device. Each of components is connected to the CPU 103 through a bus 119. The CPU 103 realizes each function by performing data communication through the bus 119 and communicating with each component. Other components include a ROM (Read-only Memory) 105, a RAM (Random-Access Memory) 107, a network interface 109, a display 111, a user input device 113, and a flash memory 115.

The ROM 105 stores therein various programs and various pieces of data. The program stored in the ROM 105 include, for example, a browser 50. The browser 50 is information browsing software for browsing information, which is described in a predetermined markup language. The information can be browsed online or offline.

In the RAM 107, various programs stored in the ROM 105, for example, are expanded. According to a user operation through the user input device 113 (hereinafter, simply referred to as "a user operation"), a program stored in the ROM 105 (for example, the browser 50) is read out, and the program is expanded in a predetermined area in the RAM 107 and executed. In this manner, the browser 50 is activated and the user can perform Web browsing. Further, in the terminal device 10, a 5-way key or a ten key, etc., is implemented as a user input device 113. A signal corresponding to an operational key which is pushed by a user is input to the CPU 103. The CPU 103 executes the program corresponding to the input signal using the program expanded in the RAM 107, thereby various functions including a Web browsing function are realized in the terminal device 10.

Here, the function of the browser 50 is explained. First, a browser engine 30 which is a basic component of the browser 50 is explained with reference to FIG. 3.

Figure 3:
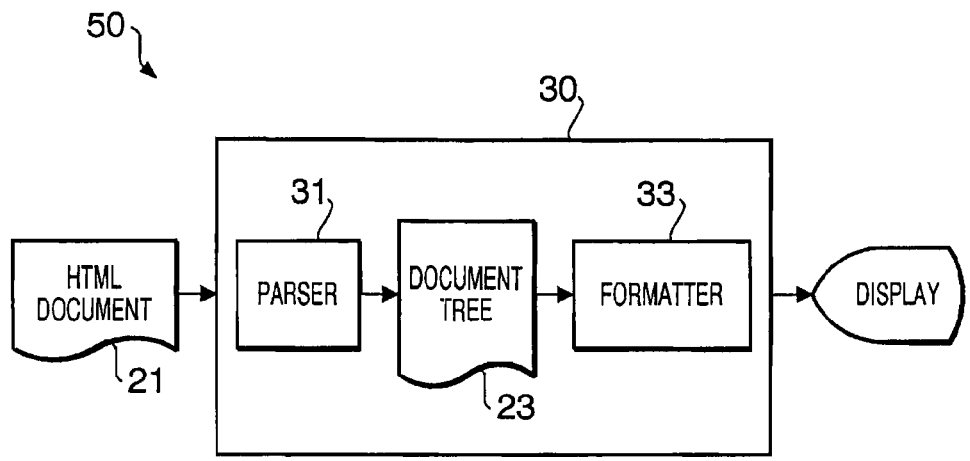
FIG. 3 illustrates a functional block diagram of a browser engine included in a browser according to a first embodiment of the invention.

FIG. 3 is a functional block diagram of the browser engine 30 included in the browser 50. As shown in FIG. 3, the browser engine 30 includes functional blocks corresponding to a parser 31 and a formatter 33.

When a URI is designated through an operation to access a Web content, for example, by inputting a URI through the user input device 113 (or by selecting an anchor included in a Web page, or by selecting a URI stored in the terminal 10 as a bookmark or a history), the browser 50 generates a request message, which is conforming to the HTTP (Hypertext Transfer Protocol), to request a resource such as a Web content and sends it, for example, to the designated URI on a network.

Then, a server corresponding to the designated URI generates a response message corresponding to the received request message and replies. The replied response message reaches to the browser 50 through the network and the response message is passed to the parser 31. In the message body of the response message, a markup document 21, to which a URI is designated, which is described in an HTML or an XHTML, etc., is embedded.

The parser 31 parses the markup document 21, generates a document tree 23 which represents the document structure of the markup document 21 in terms of a tree structure (for example, a DOM (Document Object model) tree), and expands the document tree in the RAM 107. Further, the document tree 23 is a data representing an outline of the markup document 21 which has nodes corresponding to respective elements of the markup document 21. The document tree 23 only describes the document structure of the markup document 21, and the document tree 23 does not include information about representation of the document.

In the browser engine 30, based on information about the document tree 23, tags, and style sheets, etc., a layout tree 25 which includes a representation format for the markup document 21, such as block, inline, table, and list, etc., is generated. The layout tree 25 represents an order in which block, inline, and table, etc., exist. However, the layout tree 25 does not include information about which position and with what widths and heights these elements (block, inline, table, etc.) are displayed on a screen on the terminal device's side, and information about from where the text is folded, etc.

The formatter 33 executes well-known formatting based on information about the layout tree 25 and the specification of the terminal device 10 (for example, the screen size of the display 111 or the aspect ratios, etc.). Then, the formatter 33 determines layout of each element (for example, folding of text in accordance with the pixel number in the width direction on the screen, a position, a width, and a height of each element, etc.) on the screen of the display 111. Next, based on the determined layout, the formatter 33 executes rendering and generates drawing data. The generated drawing data is expanded, for example, in a video memory area of the RAM 107. In this manner, the markup document 21, namely, the requested page is shown on the display 111.

Figure 4:
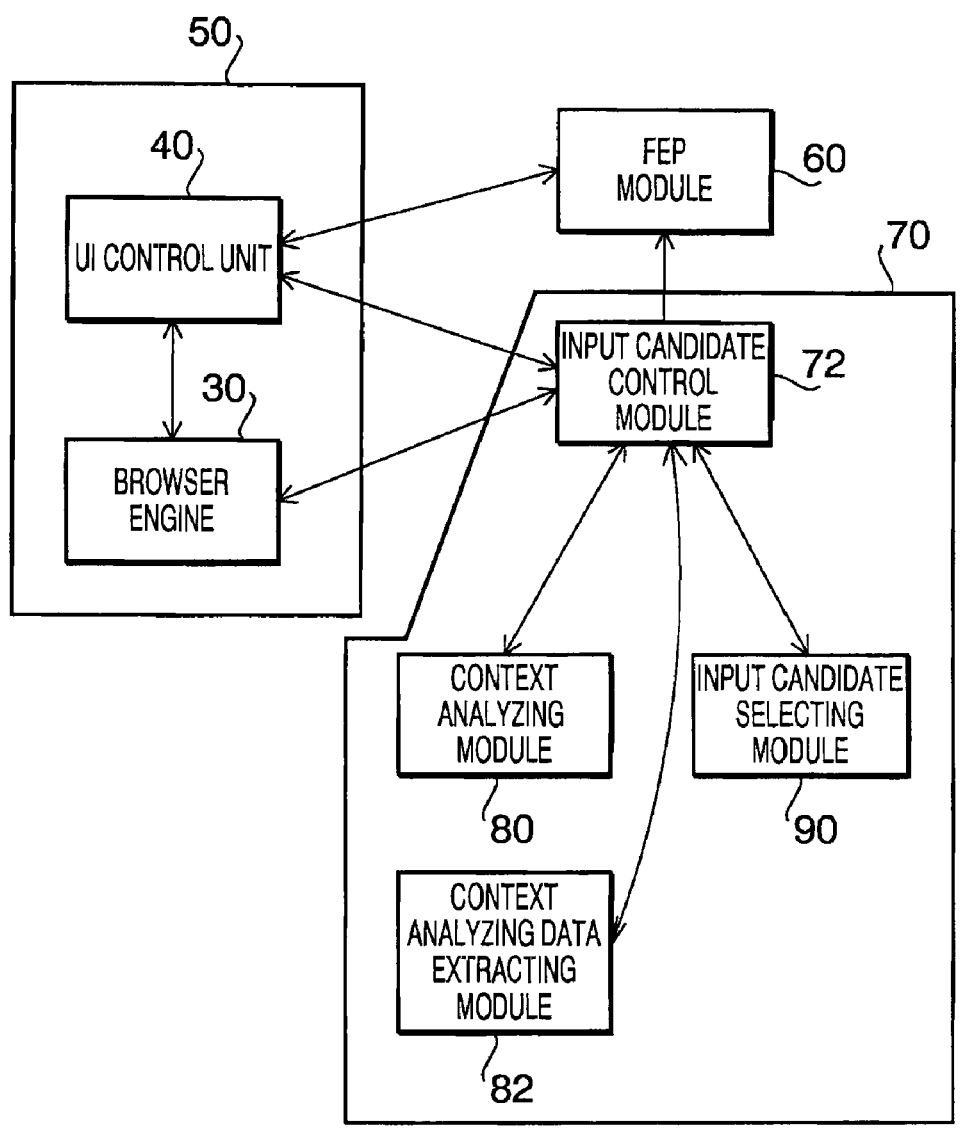
FIG. 4 is a functional block diagram illustrating each function for executing an input candidate providing process according to a first embodiment of the invention.
Figure 5:
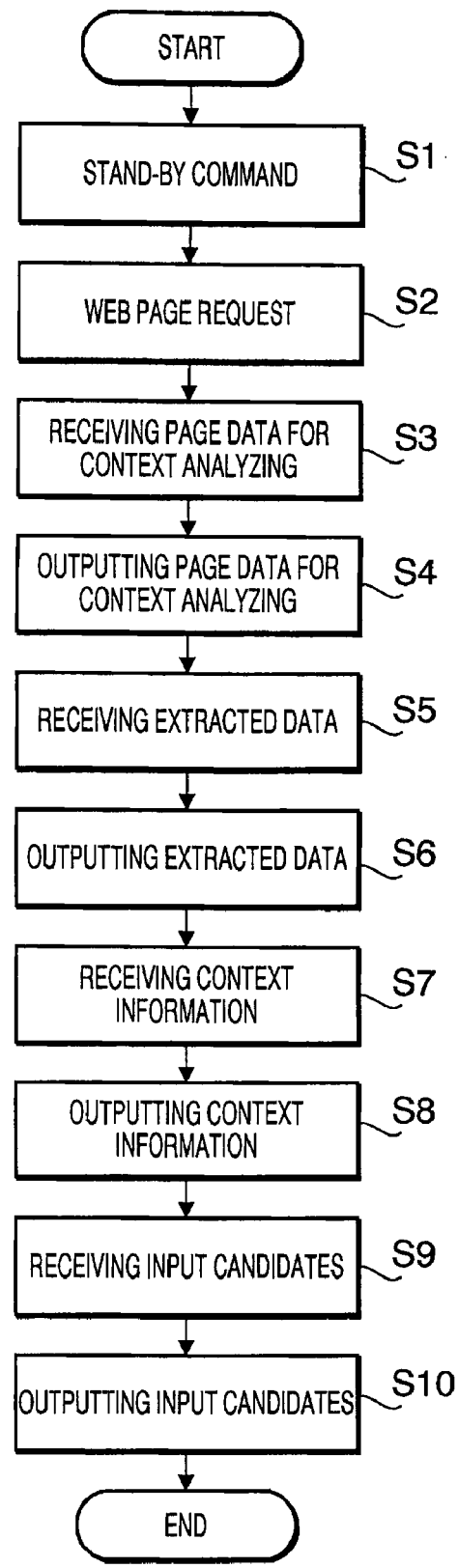
FIG. 5 is a flowchart illustrating an input candidate providing process executed in accordance with a first embodiment of the invention.

Here, it is assumed that the markup document 21 includes a form element. An input candidate providing process according to the embodiment of the invention which is executed on the terminal device 10, in this case, is explained. FIG. 4 illustrates functional blocks with which functions to execute the input candidate providing process are represented. Further, FIG. 5 is a flowchart illustrating the input candidate providing process.

As shown in FIG. 4, centered by a CICS (Context-dependent Input Candidates Showing System) 70, the browser 50, an FEP (Front End Processor) module 60, and the CICS system 70 cooperate together and operate, thereby the input candidate providing process according to the embodiment of the invention is executed. The browser 50 includes the browser engine 30 and a UI (user interface) control unit 40. When the UI control unit 40 detects that a key event (here, focusing on a form (or selecting a form) in a Web page through a user operation) with respect to the browser 50 has been arisen, the input candidate providing process is executed as an event handler corresponding to the key event.

The CICS system 70 includes a group of modules such as an input candidate controlling module 72, a context analyzing module 80, a context analyzing data extracting module 82, and an input candidate selecting module 90, etc. The input candidate controlling module 72, which is the core of the CICS system 70, integrally executes delivery and receipt of data among modules in the CICS system 70. The FEP module 60 and the CICS system 70 are stored, for example, in the ROM 105. Further, in this embodiment, each function is realized as a module, but in another embodiment, each function can be realized as a single program. Furthermore, each function can be originally implemented in the browser 50 as a part of the browser 50.

Further, if some text input to a Web page (for example, input to an authentication dialog or an inquiry dialog from a script), which is currently displayed, is made at a time of normal processing (namely, when the input candidate providing process is not executed), then data is exchanged among the UI control unit 40 and the FEP module 60. The FEP module 60 is a well-known Japanese language input program which executes kana-kanji conversion. The FEP module 60 obtains kana or conversion candidates corresponding to the input text from a kana-kanji dictionary stored in the flash memory 115 and passes them to the UI control unit 40. In this manner, kana or the conversion candidates are shown on the display 111 and, for example, selection of the conversion candidates through a user operation or determination of the input text is executed. Further, the FEP module 60 is not limited to a Japanese language input program, and it can be an input program for another language.

Next, the input candidate providing process is explained with reference to FIG. 5. In the flowchart in FIG. 5 and the explanation below, a "step" is abbreviated with "S." First, if the UI control unit 40 detects that the above key event has arisen (namely, a form is focused), then the UI control unit 40 outputs an activation command to the CICS system 70. After receiving the activation command, the CICS system 70 (the input candidate controlling module 72) outputs a stand-by command to the FEP module 60 (S1). When the FEP module 60 receives the stand-by command, the state of the FEP module 60 transits to a stand-by state. In this manner, the module which exchanges data with the UI control unit 40 is switched from the FEP module 60 to the input candidate control module 72.

When the input candidate providing process is terminated, the input candidate control module 72 outputs an activation command to the FEP module 60. In this manner, the module which exchanges data with the UI control unit 40 is returned to the FEP module 60. The data exchange between the UI control unit 40 and the FEP module 60 continues until the next execution of the input candidate providing process. Further, the input candidate control module 72 can, for example, cooperate with the FEP module 60 to operate, without setting the state of the FEP module 60 to the stand-by state.

The input candidate control module 72 requests information about the currently displayed Web page (here, for example, the document tree 23 itself or data representing a data structure of the document tree 23, hereinafter, referred to as "page data for context analyzing") from the browser engine 30 (S2). As a response, the input candidate control module 72 receives page data for context analyzing (S3), and passes the page data for context analyzing to the context analyzing data extracting module 82 (S4).

The context analyzing data extracting module 82 analyzes the received page data for context analyzing, and extracts text data, positional relationships of the nodes in the document tree 23 and attribute values of elements in a neighborhood of the form element which corresponds to the focused form, for example. Next, the context analyzing data extracting module 82 returns the extracted data to the input candidate control module 72. Further, the extracted text data is the text data to be displayed on a Web page, and text data describing each element or attribute (for example, <form., <id>, etc.) is excluded. Furthermore, "the text data in a neighborhood of the form element" is the text data for a predetermined number of words, which are to be displayed, for example, on a Web page, to be placed in front of and after the form. The context analyzing data extracting module 82 can determine whether the texts placed in front of and after the form are words which make sense or not by referring to a dictionary for extracting text in the CICS system 70, for example. Further, the range of extracting text data, positional relationships of nodes, and attribute values, etc., can be more broad, and it can be the whole Web page, for example. Here, the context analyzing data extracting module 82 extracts text data, positional relationships of nodes, and attribute values of elements from the whole Web page, and, further, extracts similar data to be extracted from the neighborhood of the form element.

After receiving the extracted data from the context analyzing data extracting module 82 (S5), the input candidate control module 72 outputs the extracted data with a context analyzing command to the context analyzing module 80 (S6). After receiving the context analyzing command, the context analyzing module 80 executes a known context analyzing algorithm using the extracted data received with the context analyzing command. The context analyzing module 80 analyzes the extracted data and estimates its context, and returns the result of the estimation as context information to the input candidate control module 72. Further, the context analyzing module 80 has held candidates for the context information (for example, "music," "sport," etc.) therein, in advance. The context analyzing module 80 obtains the context information, which is determined to be appropriate, from the candidates as the result of the estimation. If texts in a neighborhood of a form, which are to be displayed on a Web page, are suggestive of music, for example, then the context analyzing module 80 obtains a keyword, "music," as the context information from several candidates. Further, if estimate accuracy of the context analyzing module is high, then, for example, a music genre of the music or the name of a particular artist can be obtained as the context information. There are various algorithms for context analyzing. One example of the algorithms for context analyzing is disclosed in Japanese Patent Provisional Publication No. 2006-107353. Further, if a form element is contained in a cell of a table, it is possible to grasp that the form element is contained in a cell of a table from positional relationships of nodes. In this case, since the possibility that there exists a sentence explaining the form in the neighboring cell is high, it is possible to raise precision of context analyzing by giving weight to the sentence explaining the form, for example. Further, a label element which is associated with a form element can be grasped from positional relationships of nodes, and the label element can be utilized for context analyzing. Furthermore, as a specific example of an attribute value of an element, an embodiment in which a name attribute value of a form element is referred and used for context analyzing can be considered.

Further, in the first embodiment, the context analyzing module 80 obtains "the name of a particular artist" from the data extracted from the whole Web page as context information of the large classification. Furthermore, the context analyzing module 80 obtains "album" from the data extracted from the neighborhood of the form element as context information of the small classification.

After receiving the context information (S7), the input candidate control module 72 outputs the received context information with an input candidate selection command to the input candidate selecting module 90 (S8). After receiving the input candidate selection command, the input candidate selecting module 90 selects input candidates to the form using the context information received with the input candidate selection command.

To add an explanation, an input candidate database, which stores words to become input candidates, is stored in the flash memory 15. In the input candidate database, each word is associated with at least one of keywords (context information) which are held by the context analyzing module 80 as candidates. For example, words "artist A" are stored in the input candidate database with the state in which the words are associated with "music" and "JAZZ," which are pieces of context information. Further, the above information in the input candidate database is not limited to the information stored previously, and it includes information retrieved from an external server (for example, a site of a record company or a site of a music company, or a database server which distributes input candidates for each genre) and stored therein.

The input candidate selecting module 90 utilizes the context information received from the input candidate control module 72 as a retrieval key and searches the input candidate database, and obtains the corresponding input candidates. Then the input candidate selecting module 90 returns the obtained input candidates to the input candidate control module 72. For example, as described above, if the context information regarding the whole Web page is the name of a particular artist, and if the context information regarding the neighborhood of the form element is an album, then as input candidates corresponding to the form, names of albums (context information of the small classification) which have been released by the particular artist (context information of the large classification) are obtained. Further, for example, if context information of another form element in the same page is a name of a song, then as input candidates corresponding to the form, names of songs which have been released by the above particular artist are obtained. The input candidates obtained includes text data in which plural input candidates are listed in a predetermined order, for example.

Further, in the above example, the context analyzing module 80 obtains two hierarchical classifications (namely, the large classification and the small classification) of the context information, but in another embodiment, ranges of the extracted data to be extracted are refined, for example, and plural classifications of context information can be obtained. For example, context information of the whole Web page is obtained as context information of the large classification, context information of the first half of the Web page is obtained as context information of the middle classification, and context information of the neighborhood of the form element is obtained as context information of the small classification. In this case, the input candidate selecting module 90 can realize more accurate input candidate selection.

Further, the order of the list of input candidates is, for example, the order the input candidates are searched. Furthermore, by adding priority information with respect to context information to each word in the input candidate database, input candidates can be listed in the order of high priority. The priority can be, for example, set by a vendor who supplied the CICS system 70, in advance, or the priority can be dynamically updated in accordance with a user history. To explain the latter example simply, suppose that the terminal device 10 stores music data in MP3 (MPEG Audio Layer-3), for example, and the corresponding index in the flash memory 115. The index includes play rates which corresponds to the number of times of plays. The play rates are periodically checked, and high priority is assigned to music with a high play rate or an artist with a high play rate. Consequently, for example, the list of input candidates which can be obtained in the case in which the context information is "music" is the list in which words related to the music with a high play rate or the artist with a high play rate are ranked in an upper level. Namely, the input candidates are listed in the order corresponding to a user's preference.

After receiving input candidates (S9), the input candidate control module 72 passes the input candidates to the UI control unit 40 (S10) and terminates the input candidate providing process. The UI control unit 40 displays the received input candidates in the order of the list in a pull-down menu from the form which has been focused. When an input candidate included in the list is selected and designated by a user operation, the input candidate is input to the form (in the specification, a state in which input to a form has been determined is expressed as "input").

Namely, a user can obtain input candidates only by focusing a form, without any text input. Further, in order to input text to the form, the user merely selects and designates an input candidate from the input candidates displayed in the pull-down menu. In addition, since the input candidates displayed in the pull-down menu reflect the context in front and after the form, it is expected that there is an effect such that suitable input candidates are supplied to the user with high probability. For example, an input device such as a mobile telephone (here, the user input device 113) is low in operability because of limitations of a number and sizes of keys, thus it is not suitable for text input compared with other devices (for example, a desktop PC). It is extremely beneficial to be highly accurate in supporting form input in such a device which is potentially low in operability, from the point of view that it can lead to reduce the burden on a user operation.

Further, according to the first embodiment, there is an advantage of an Web server's side which provides a Web page. Specifically, there is no requirement for the Web server's side to implement something special (for example, to install Ajax (Asynchronous JavaScript+XML) (JavaScript is a registered trademark) on a Web page, etc., to dynamically present input candidates) to supply input candidates to a client. For a user of the terminal device 10, operability of a Web page is improved since suitable input candidates are supplied. Thus, the user accesses the Web page more frequently. Consequently, the Web server's side can enjoy an advantage of an increase in the number of accesses, for example.

Further, when characters are input one by one to a form through pushing a ten key, etc. while input candidates are displayed in a pulldown menu, the input candidates displayed in a pulldown menu are dynamically narrowed down to input candidates which match with characters which are input. In this manner, a user can easily find an intended input candidate from many input candidates.

Further, the input candidate control module 72 can select a predetermined number of input candidates which satisfies a predetermined condition from the list of the input candidates received from the input candidate selecting module 90 (for example, by narrowing down to the input candidates ranked in an upper level), and can pass the selected input candidates to the UI control unit 40. It is beneficial for the case in which the list is made in accordance with the descending priority order. In this case, the selection of the input candidates is mainly done in order to reduce the amount of data exchanged between the input candidate control module 72 and the UI control unit 40 by cutting down the input candidates listed in a lower level.

Further, text which has been input to a form can be added to the input candidate database. Furthermore, if there is text which have been input to a form in the input candidate database, then the priority of the text can be raised. In this manner, since a history of actual inputs to a form is dynamically reflected in making a list, the order of input candidates in the list is gradually updated so as to be consistent with user's preferences.

Further, the input candidate providing process can be started at a time when a Web page including a form element is received from a Web server. In this case, a user can obtain input candidates suitable for the form without even focusing on the form. Further, at the time, extracted data (text data, positional relationships of nodes in the document tree, and attribute values of elements, etc. in the neighborhood of the form element) can be extracted, as in the previous embodiment, or the extracted data of the whole Web page can be extracted, and the extracted data can be analyzed by the context analyzing module 80. Furthermore, when a Web page includes plural forms, the input candidate providing process of FIG. 5 can be sequentially executed to each form through batch processing at a predetermined timing (for example, at a time when a Web page is received from a Web server).

Further, the input candidate control module 72 can associate a list of input candidates received from the input candidate selecting module 90 with the corresponding Web page, and cache the list in the RAM 107. According to this example, the input candidate control module 72 receives page data for context analyzing from the browser engine, and compares the received page data with a content which have been cached. When there exists a corresponding list, then the input candidate control module 72 can pass it to the UI control unit 40 immediately. In this manner, the processing speed is increased. Thus, it is possible to provided input candidates to a user promptly. Further, if it is confirmed that the Web page is updated by referring to meta data, etc., of the Web page, then, since there are some possibilities that texts in the neighborhood of a form are updated, it is preferable to execute the input candidate providing process of FIG. 5. Furthermore, the input candidate control module 72 can associate the list of input candidates received from the input candidate selecting module 90 with the corresponding Web page, and cache the list in the flash memory 115. In this case, it is advantageous in a point that the data in which the list and the Web page are associated remains after once a power supply is turned off.

Second Embodiment

Figure 6:
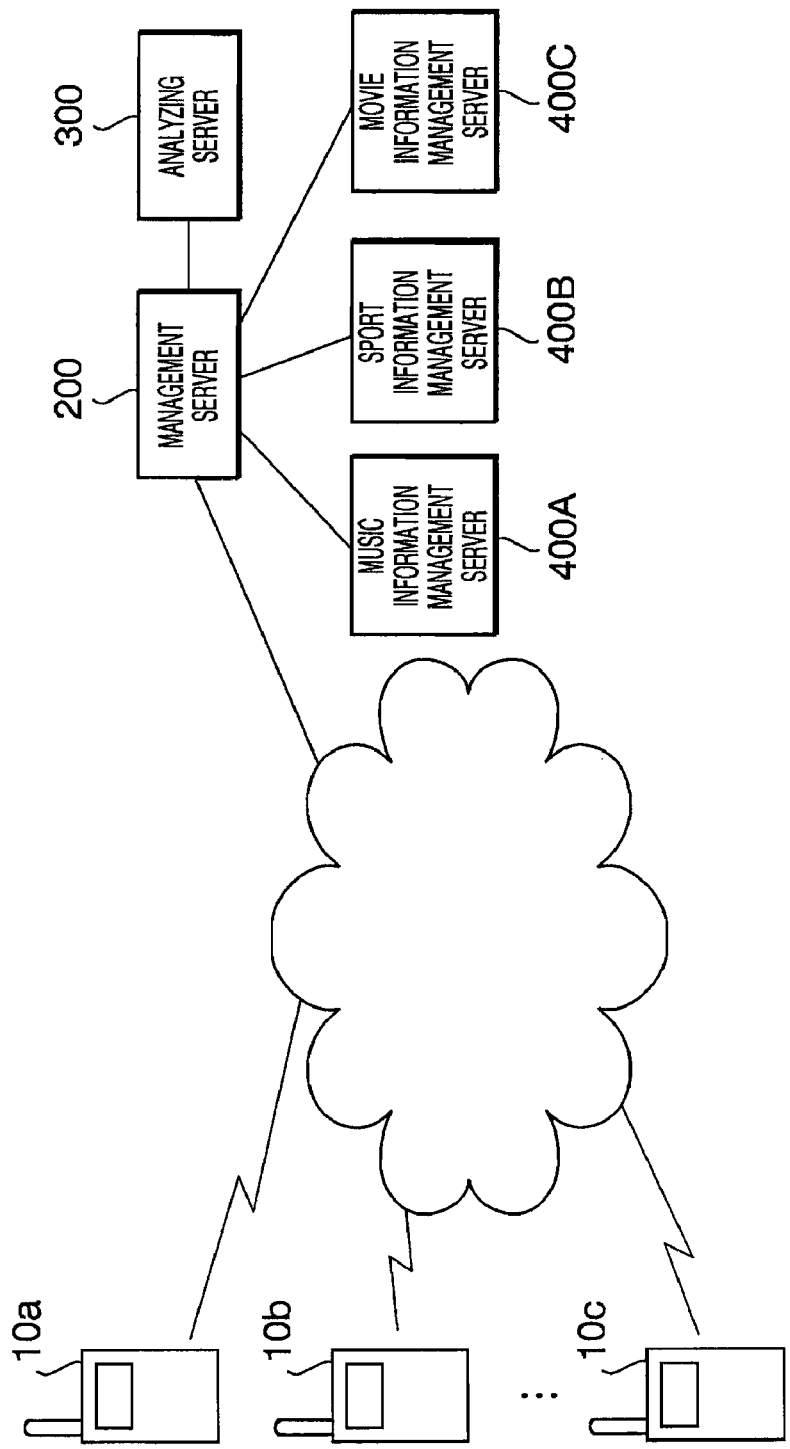
FIG. 6 is a block diagram illustrating an input candidate providing system according to a second embodiment of the invention.

Since, in general, a context analyzing process or an input candidate selecting process is a process with a heavy load, a distributed input candidate providing system in which terminals with high processing capability share respective processes can be considered. FIG. 6 is a block diagram illustrating a second embodiment of an input candidate providing system according to the invention. As shown in FIG. 6, the input candidate providing system according to the second embodiment includes a management server 200. Many terminal devices 10a, 10b, 10c, . . . , can be connected with the management server 200 through a communication network of a carrier.

The terminal devices 10a, 10b, 10c, . . . , are basically configured in the same manner as in the case of the terminal device 10. However, in the terminal devices 10a, 10b, 10c, . . . , a CICS system 70 does not include a context analyzing module 80, a context analyzing data extracting module 82, and an input candidate selecting module 90. Thus, the terminal devices 10a, 10b, 10c, . . . , are superior in the aspect of cost than the terminal device 10. Further, the terminal devices 10a, 10b, 10c, . . . , have the same configuration. Therefore, hereinafter, to avoid overlapping of explanations, the explanation of the terminal device 10a represents the explanations of other terminal devices, and the explanations of other terminal devices such as 10b or 10c are omitted.

When the input candidate providing process is started in the terminal device 10a, first, the same processes as in the case of the processes from S1 to S3 in FIG. 5 are executed. Here, in the embodiment, as described above, all of the context analyzing module 80, the context analyzing data extracting module 82, and the input candidate selecting module 90 are not implemented in the terminal device 10a. Therefore, the input candidate control module 72 sends page data for context analyzing and a context analyzing command to the management server 200, in order to leave the context analyzing process and the input candidate selecting process to the server's side.

Figure 7:
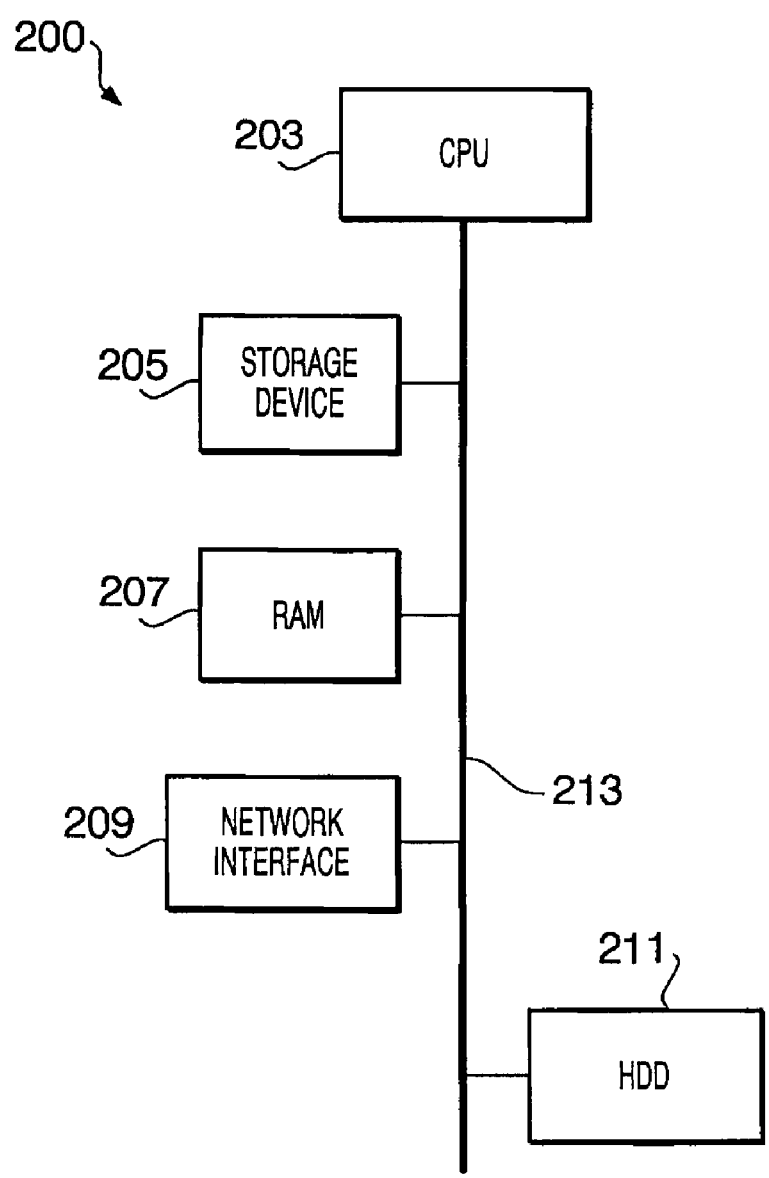
FIG. 7 is a block diagram illustrates a configuration of a management server according to a second embodiment of the invention.

FIG. 7 is a block diagram illustrating the architecture of the management server 200. As shown in FIG. 7, the management server 200 has a CPU 203 which integrally controls the entirety of the device. The CPU 203 is connected to each of components through a bus 213. The CPU 203 realizes various kinds of functions by executing data communication through the bus 213 to exchange with each of the components. These components include a storage device 205, a RAM 207, and a network interface 209.

The storage device 205 stores various programs and various pieces of data therein. The programs stored in the storage device 205 include, for example, a program which processes a request from the terminal device 10a, etc. The RAM 207 is the destination where various programs stored, for example, in the storage device 205 are expanded. The above program is kept in the state in which the program is expanded and resides, for example, in the RAM 207, as long as the management server 200 is activated. Namely, the management server 200 is always in the state of monitoring whether there is a request from a client or not. Therefore, in the management server 200, the above program is executed immediately in response to a request from the terminal device 10a, etc., and it is possible to generate a dynamical response and send it out.

Further, in the second embodiment, the management server 200 functions as a service-window for a client, the management server 200 assigns the context analyzing process and the input candidate selecting process to other devices to distribute the load. The management server 200 is connected with a analyzing server 300, a music information management server 400A, a sport information management server 400B, a movie information management server 400C, . . . , through, for example, a LAN (Local Area Network) or an Internet VPN (Internet Virtual Private Network), and the load is shared by these servers. Further, the analyzing server 300 and the plurality of the music information management server 400A, the sport information management server 400B, a movie information management server 400C, . . . , have the architecture including a CPU, a storage device, a RAM, and a network interface, as in the case of the management server 200, respectively. Hence, their architectural diagrams are omitted. The music information management server 400A, the sport information management server 400B, the movie information management server 400C, etc., can be provided by different service providers, respectively.

After receiving the above page data for context analyzing and the context analyzing command from the terminal 10a, etc., the management server 200 sends the page data for context analyzing and the context analyzing command to the analyzing server 300. The analyzing server 300 executes an extraction task to the above page data for context analyzing received from the management server 200, and executes context analyzing process to the extracted data. The analyzing server 300 estimates the context and returns the result of the estimation as context information to the management server 200. Namely, the analyzing server 300 plays the same role as the role of the context analyzing module 80 and the role of the context analyzing data extracting module 82 in the first embodiment. However, since the analyzing server 300 is dedicated to context analyzing, the context information obtained by its context analyzing algorithm is highly accurate. Further, the time spent for the context analyzing process is short, thus, it is possible to output the context information instantaneously.

Next, the management server 200 determines a server which selects input candidates based on the context information. In particular, the management server 200 holds a table in which context information and a server for each genre is associated. By referring to the table based on the context information received from the analyzing server 300, the management server 200 determines the server which selects input candidates. For example, when the context information is information about an artist, the management server 200 determines the music information management server 400A, which administers a database related to music, as the server which selects input candidates. Further, for example, when the context information is information about sport, the management server 200 determines the sport information management server 400B, which administers a database related to sport, as the server which selects input candidates. Further, for example, when the context information is information about movies, the management server 200 determines the movie information management server 400C, which administers a database related to movies, as the server which selects input candidates. The management server 200 transmits the context information and an input candidate selection command to the server which is determined to be the server which selects input candidates.

The music information management server 400A, the sport information management server 400B, the movie information management server 400C, . . . , store input candidate databases, respectively, in which words for the respective specific genres are stored. For example, in the music information management server 400A, an input candidate database, in which various words related to music are stored, is administered. The input candidate database here is the same as the input candidate database in the first embodiment. However, since the input candidate database for each genre is a database specialized for each genre, with which the input candidate database corresponding to each genre is administered, it has enormous amount of information. Further, for example, by implementing a complex algorithm to give priority, it becomes possible to give priority to each word finely.

Hence, the server which has received the context information and the input candidate selection command from the management server 200 (here, say, for instance, the music information management server 400A) searches the input candidate database using the received context information as a retrieval key, and obtains the corresponding input candidates. Next, the server generates a list based on order of search or order of priority, etc., and returns the list to the management server 200. Namely, the music information management server 400A plays the same role as the role of input candidate selecting module 90.

After receiving the list of the input candidates from the music information management server 400A, the management server 200 sends the list of the input candidates to the terminal device 10a. In this manner, on the terminal device 10a, the list of the input candidates is displayed in a pulldown menu from the form which has been focused, and the list is presented to a user.

According to the second embodiment, since the load is distributed, even if requests from many clients concentrate on the management server 200, it is possible to supply stable services to a user. Further, by letting the specialized servers execute the respective processes, it is possible to increase accuracy of the input candidates to be selected and to provide input candidates to a client quickly. Further, when the management server 200 has cached the list of input candidates as in the case of the first embodiment, the management server 200 supplies highly accurate input candidates to a client very quickly.

Further, the terminal device 10a supplies several pieces of user information to the management server 200, for example, in order to enjoy receiving services. In this case, the management server 200 administers each piece of user information for a user by making a database, and the management server 200 has a function to determine each user's preference by utilizing the database. In addition, it is possible to send data which is made by filtering the input candidates to be sent to the terminal device 10a based on the result of the determination, and in which only the input candidates matching up with the user's preference are listed.

Further, it is possible to consider a business model, in which, for example, a record company pays an advertisement fee to the administrator of the management server 200 and, as the compensation, the record company promotes an input candidate which has benefit to the record company itself (for example, an input candidate for aiming at an advertisement effect, such as information about an artist which has been promoted) so that the input candidate is ranked in an upper level in the list. In this case, the input candidate for aiming at an advertisement effect is added to the music information management server 400A, and the input candidate is given high priority depending on the advertisement fee which has been paid. For example, when a Web page of the above record company is accessed with the terminal device 10a and a form in the Web page is focused, the sets of the above described processes are executed and "music" is obtained as the context information. Next, in the music information management server 400A, the input candidate selecting process is executed, and a list of input candidates is generated. Since the order of the list is determined based on, for example, priority, a list, in which the input candidate for aiming at an advertisement effect is ranked in an upper level, is generated and supplied to a user. The higher an input candidate is positioned in the list, the higher the probability that a user selecting the input candidate becomes. Thus, the input candidate providing system according to the second embodiment can be said to be highly useful as one of advertisement strategies. Further, by executing the input candidate providing process for a form through batch processing, an input candidate with the highest priority is automatically input to the form. In this manner, a much higher advertisement effect can be expected.

Further, in a modified example of the second embodiment, the management server 200 can execute all of the context analyzing process and the input candidate selecting process. In this case, only one server is installed by the service provider's side. Thus, it is advantageous in the aspect of cost. Further, for the servers to be installed, various number, types, and modes of distribution can be considered, and it is desirable to construct the input candidate providing system that deemed to be the best in view of the aspect of cost.

Third Embodiment

Figure 8:
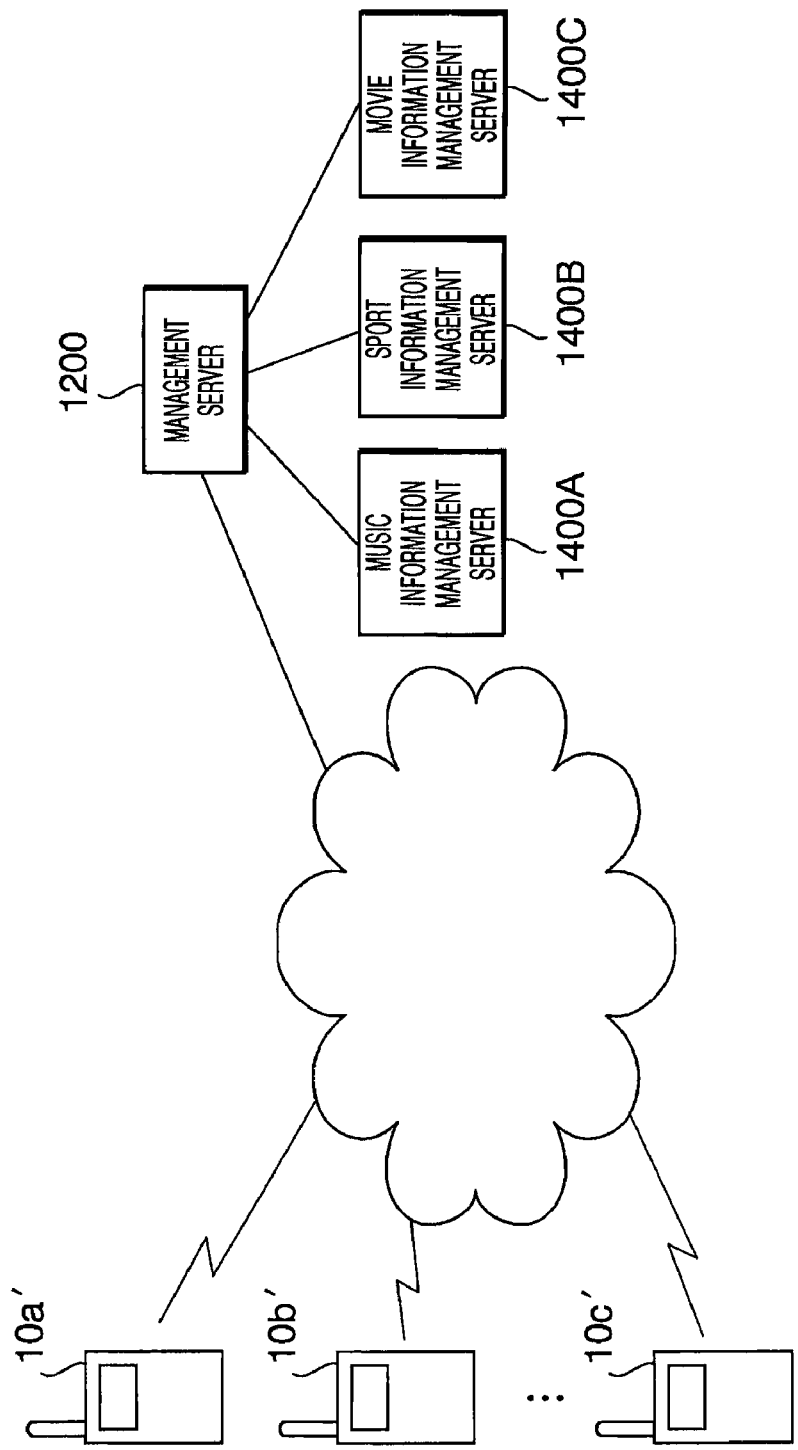
FIG. 8 is a block diagram illustrating an input candidate providing system according to a third embodiment of the invention.

Further, in general, the context analyzing process can be executed with less resource than the resource for the input candidate selecting process. Based on this thought, it can be said that an embodiment in which the context analyzing process is executed at the terminal device's side and the input candidate selecting process is executed at the server's side is advantageous. FIG. 8 is a block diagram illustrating an input candidate providing system according to a third embodiment of the invention. As shown in FIG. 8, the input candidate providing system according to the third embodiment includes a management server 1200. The management server 1200 can be connected with many devices 10$a'$, 10$b'$, 10$c'$, . . . , through a network of a carrier. Further, the management server 1200 is connected with a plurality of servers such as a music information management server 1400A, a sport information management server 1400B, and a movie information management server 1400C, etc. Further, the management server 1200 and the plurality of servers such as the music information management server 1400A, the sport information management server 1400B, and the movie information management server 1400C, etc., have the same architecture in which a CPU, a storage, a RAM, and a network interface are included as in the case of the management server 200, thus their architectural diagrams are omitted here.

The terminal devices 10$a'$, 10$b'$, 10$c'$, . . . , have basically the same configuration as in the case of terminal device 10. However, in the terminal devices 10$a'$, 10$b'$, 10$c'$, . . . , the input candidate selecting module 90 is not included in the CICS system 70, so that the terminal devices 10$a'$, 10$b'$, 10$c'$, . . . , are superior in the aspect of cost than the terminal device 10. Further, the terminal devices 10$a'$, 10$b'$, 10$c'$, . . . , have the same configuration. Therefore, hereinafter, in order to avoid overlapping of explanations, the explanation of the terminal device 10$a'$ represents the explanations of other terminal devices such as the terminal device 10$b'$ or the terminal device 10$c'$, and the explanations of other terminal devices such as the terminal device 10$b'$ or the terminal device 10$c'$ are omitted.

When the input candidate providing process is started in the terminal device 10$a'$, first, the same process as the processes from S1 to S7 in FIG. 5 are executed. Next, the input candidate control module 72 determines to obtain input candidates either internally within the terminal device 10$a'$ or from the server's side, based on context information obtained from the context analyzing module 80.

For example, when a name attribute and an id attribute of a form element of a focused form are "e-mail" and "phone," then "contact information" is obtained as the context information. In this case, suitable input candidates corresponding to the "contact information" are not stored in the server's side, and the suitable input candidates are deemed to be stored only in the terminal's side. Therefore, the input candidate control module 72 accesses an internal area of the terminal device 10$a'$ in which an address book is stored. Then, the input candidate control module 72 obtains e-mail addresses and telephone numbers stored in the area, and passes them to the UI control unit 40. In this manner, the e-mail addresses and the telephone numbers passed to the UI control unit 40 as the input candidates are shown in a pulldown menu from the form.

Further, when the context information is not the information such as the "contact information," the input candidate control module 72 sends the context information received from the context analyzing module 80 and an input candidate selection command to the management server 1200. The management server 1200 determines a server which selects input candidates in accordance with the received context information as in the case of the second embodiment. Here, one of the music information management server 1400A, the sport information management server 1400B, the movie information management server 1400C, . . . , is determined to be the server which selects input candidates. The management server 1200 obtains a list of input candidates by letting the determined server execute the input candidate selecting process, and sends the list to the terminal device 10$a'$. In this manner, in the terminal device 10$a'$, the list of input candidates is shown in a pulldown menu from the form which has been focused and presented to a user.

Further, the server with which the input candidate control module 72 exchanges data is not limited to the management server 1200. The input candidate control module 72 has plural pieces of connecting information for plural servers. The input candidate control module 72 determines the server with which the input candidate control module 72 is connected, in accordance with, for example, the Web page which is currently browsed or the content of the context information. Additionally, the input candidate control module 72 is administering information about servers which are to be connected with, on a Web-site-by-Web-site basis, or a genre-by-genre basis for the genres obtained as the context information.

According to the third embodiment, it is determined that there exist input candidates in the terminal device or the outside in accordance with the content of the context information, and the input candidates are obtained from the place corresponding to the result of the determination. Thus, input candidates can be obtained from more suitable place, and highly accurate input candidates can be supplied to a user. Additionally, according to the third embodiment, it is advantageous to a user that suitable input candidates can be always obtained without providing personal information to the server's side.

The embodiments of the invention are described above. However, the invention is not limited to the embodiments described, but various modifications can be made within the scope of the invention. For example, it is possible to provide further embodiment by suitably combining functions and configurations described in the first embodiment, the second embodiment, and the third embodiment (for example, to apply the batch processing in the first embodiment to the second embodiment or the third embodiment).

Further, for example, the context analyzing data extracting module 82 extracts text data in the neighborhood of the form element at S4 in FIG. 5, but, in this case, the range of extraction can be set by a user.

Further, for example, the client and the server can share and execute the context analyzing process and the input candidate selecting process. As an example of sharing the input candidate selecting process, an embodiment can be considered in which input candidates are obtained in the server's side, the input candidates are passed to the terminal device, and the input candidates are sorted in the terminal device's side. In this case, by setting the sort, a user has an advantage such that input candidates are listed in accordance with the user's preference.

Further, in the first embodiment (or in the third embodiment), for example, when the context analyzing module 80 obtains plural pieces of context information (for example, the name of a particular artist or a place, a category name (music, actor, movie, etc.)), the input candidate control module 72 can give weights to the plural pieces of context information, respectively (for example, executes based on the number of times they appear in the extracted data). Each piece of the weighted context information can be transmitted to the input candidate selecting module 90 (or the management server 1200). The input candidate selecting module 90 (or the management server 1200), for example, determines the number of input candidates to be selected for each pieces of context information based on the weight given by the input candidate control module 72. Here, a process can be considered in which, for example, many input candidates are selected for a piece of context information with a greater weight, and a few input candidates are selected for a piece of context information with a smaller weight.

Further, in the third embodiment, the input candidate control module 72 can let a separated server execute an input candidate selecting process corresponding to each piece of context information by setting separated servers for pieces of context information, respectively. For example, an embodiment can be considered in which a piece of context information related to music is transmitted to a dedicated server for executing input candidate selecting processes related to music, and a piece of context information about movie information is transmitted to a dedicated server for executing input candidate selecting processes related to movie. Since input candidate selecting processes are executed by dedicated servers specialized for respective genres, more accurate input candidate selection can be expected. Further, in the second embodiment, alternatively to the input candidate control module 72, the management server 200 can execute the above process of giving weights, the determination of the number of input candidates, and the establishment of selective connection with the server in accordance with context information.

Further, an embodiment can be considered in which the terminal device's side determines whether a Web page includes a form or not, and if a form element is included in the Web page, then the terminal device asks the server's side for the input candidate providing process. Specifically, for example, when the terminal device's side determines that a form element is included by referring to a result of parsing of a markup document or page data for context analyzing, the storage address corresponding to the Web page (such as a URI, or a URL) is noticed to the server's side. The server's side (for example, the management server) accesses the storage address and retrieves the above markup document. After that, the server's side executes a parsing process, a context analyzing process, and an input candidate selecting process. Then, the server's side returns the obtained list of input candidates to the terminal device. In this manner, in the terminal device, the received list of the input candidates is shown in a pulldown menu from the form which has been focused, and the list is presented to a user. In the embodiment, since an effect can be expected which reduces load of processing in the terminal device, it can be said that the embodiment is especially useful for a cheap version of a terminal device which is limited in resource.

An input candidate providing device, an input candidate providing system, an input candidate providing method, and an input candidate providing program according to an embodiment of the invention can be explained as follows.

An input candidate providing method according to an embodiment of the invention is a method for providing input candidates with respect to an embedded form in a content to be displayed, the method includes: a parsing result obtaining step of requesting and obtaining a result of parsing executed by a parsing function which parses a content; an analyzing step of passing the result of the parsing to an analyzing function which analyzes a context of the content, letting the analyzing function analyze the result of the parsing, and obtaining the result of the analysis from the analyzing function; an input candidate determining step of passing the result of the parsing to an input candidate determining function which determines input candidates and obtaining the input candidates from the input candidate determining function; and an input candidate indicating step of indicating the obtained input candidates to a display as input candidates with respect to the form.

According to this type of input candidate providing method, suitable input candidates which are consistent with the context of the content are provided for a form.

Further, the input candidate providing device according to an embodiment of the invention is the input candidate providing device which provides input candidates for a form embedded in a content to be displayed. The input candidate providing device includes a content retrieving means that retrieves a content from inside or outside of the input candidate providing device, a parsing means that parses the retrieved content, an analyzing means that analyzes a context of the content based on the parsing result, a storing means that stores information about input candidates which is obtained from an external device, an input candidate determining means that determines input candidates from the storing means based on the analyzing result, and an input candidate displaying means that displays the determined input candidates as the input candidates for the form.

According to the input candidate providing device configured in this manner, suitable input candidates which are consistent with the context of the content are provided for a form.

Further, the above input candidate providing device can further include, for example an extracting means that extracts first information for analyzing from a first range in the content and second information for analyzing from a second range which is included in the first range by referring to the parsing result of the parsing means. In this case, the analyzing means analyzes the content based on the extracted first information for analyzing and the extracted second information for analyzing. Here, the first range corresponds to the entirety of the content and the second range corresponds to a neighborhood of the form which is displayed on the content. In this case, the analyzing means may be configured to obtain a first class of context information based on the extracted first information for analyzing and a second class of context information, which belongs to the first class of context information, based on the extracted second information for analyzing.

Further, the above input candidate determining means may be configured to determine the input candidates, for example, from the storing means based on the first and second classes of context information.

Further, the input candidate providing device may further include, for example, an associating means that associates the input candidates determined by the input candidate determining means with the corresponding content, and stores the associated input candidates in a predetermined storage medium, and an input candidate reading-out means that reads out the input candidates associated with the content to be displayed by referring to the predetermined storage medium. In this case, the input candidate displaying means displays the input candidates which have been read out.

Further, the input candidate providing device may be configured, for example, when plural forms are embedded in the content, for the plural forms, the set of processes executed by the parsing means, the analyzing means, the input candidate determining means, and the input candidate displaying means are executed through batch processing.

Further, the input candidate providing device according to another embodiment of the invention to solve the above problem includes a content retrieving means that retrieves a content from inside or outside of the input candidate providing device, a parsing means that parses the retrieved content, an analyzing means that analyzes a context of the content based on the parsing result, a client's side transmitting means that transmits a request for obtaining input candidates and the analyzing result to the server device, a client's side receiving means that receives the input candidates from the server device as a response to the request, and a displaying means that displays the received input candidates as the input candidates for the form.

Further, the input candidate providing device may be configured to include, for example, an extracting means that extracts first information for analyzing from a first range in the content and second information for analyzing from a second range included in the first range by referring to the parsing result of the parsing means. In this case, the analyzing means analyzes the content based on the extracted first information for analyzing and the extracted second information for analyzing. Here, the first range corresponds to the entirety of the content and the second range corresponds to a neighborhood of the form which is displayed on the content. In this case, the analyzing means may be configured to obtain a first class of context information based on the extracted first information for analyzing and second class of context information, which belongs to the first class, based on the extracted second information for analyzing.

Further, the input candidate providing device can be configured to include further, for example, an obtainment determining means that determines to obtain the input candidates from the server device or inside of the input candidate providing device, based on substance of the analyzing result of the analyzing means, and when the obtainment determining means has determined to obtain from the server device, the input candidate providing device transmits the request for obtaining input candidates through the client's side transmitting means, and the input candidate providing device receives the input candidates as a response to the request through the client's side receiving means, and when the obtainment determining means has determined to obtain from inside of the input candidate providing device, the input candidate providing device accesses a predetermined memory area inside of the input candidate providing device and obtains information stored in the memory area as the input candidates.

Further, the parsing means may be configured, for example, to start executing a process of parsing the content at a time when the content is retrieved by the content retrieving means through communicating with a content providing server which provides contents.

Further, the input candidate providing device may be configured to further include, for example, a narrowing down means that narrows down the input candidates, which have been received through the client's side receiving means, based on a predetermined condition. In this case, the input candidate displaying means only displays the input candidates which have been narrowed down.

Further, the input candidate providing device may be configured to further include, for example, an input means for receiving an input through a user operation. In this case, the parsing means starts executing a process of parsing the content at a time when the form is selected through the input which has been received by the input means.

Further, for example, the analyzing means can be configured to receive plural pieces of context information, and, depending on a content of each piece of context information, the client's side transmitting means transmits the piece of context information and a request for obtaining input candidates to a corresponding server device.

Further, an input candidate providing device according to an embodiment of the invention includes a content retrieving means that retrieves a content from inside or outside of the input candidate providing device, a parsing means that parses the retrieved content, a client's side transmitting means that transmits a request for obtaining input candidates and the parsing result to the server device, a client's side receiving means that receives the input candidates from the server device as a response to the request, and an input candidate displaying means that displays the received input candidates as the input candidates for the form.

Further, an input candidate providing system according to an embodiment of the invention has the input candidate providing device and a server device, and the server device is able to communicate with the input candidate providing device. In the input candidate providing system, the server device includes a server's side receiving means that receives an analyzing result of a content and a request for obtaining input candidates from the input candidate providing device, a storing means that stores information about input candidates, an input candidate determining means that determines input candidates from the storing means based on the analyzing result, in accordance with the request, and a server's side transmitting means that transmits the determined input candidates to the input candidate providing system as a response to the request.

According to the input candidate providing system configured in this manner, suitable input candidates which are consistent with the context of the content are provided for the form.

Further, the input candidate providing device in the input candidate providing system can be configured to further includes a weight giving means which executes, when the analyzing means obtains plural pieces of context information, a process of giving weights to the plural pieces of context information, respectively, based on the parsing result of the parsing means, and, in this case, the client's side transmitting means transmits each weighted piece of context information to the server device. The input candidate determining means determines, for each piece of context information received through the server's side receiving means, input candidates of a number corresponding to the respective result of weighting.

Further, an input candidate providing system according to an embodiment of the invention has the input candidate providing device and a server device, and the server device is able to communicate with the input candidate providing device. In the input candidate providing system, the server device includes a server's side receiving means that receives a parsing result of a content and a request for obtaining input candidates from the input candidate providing device, an analyzing means that analyzes a context of the content based on the parsing result, in accordance with the request, a storing means that stores information about input candidates, an input candidate determining means that determines input candidate from the storing means based on the analyzing result, and a server's side transmitting means that transmits the determined input candidates to the input candidate providing device as a response to the request.

Further, the server device in the input candidate providing system may be configured to further include, for example, a weight giving means which executes, when the analyzing means obtains plural pieces or context information, a process of giving weights to the plural pieces of context information, respectively, based on the parsing result of the parsing means.

In this case, the input candidate determining means determines, for each weighted piece of context information, input candidates the number of which corresponds to the respective result of weighting.

Further, the server device may be configured to further include, for example, a list generating means that generates a list. The list generating means generates a list in which plural input candidates are listed in a predetermined order, when the plural input candidates are determined by the input candidate determining means.

Further, an input candidate providing system according to an embodiment of the invention is a system in which a client device and a server device cooperate to provide input candidates for a form embedded in a content, and the client device and the server device are able to communicate with each other. The client device includes a client's side content retrieving means that retrieves a content from inside or outside of the client device, a parsing means that parses the retrieved content, a form determining means that determines whether the content includes a form or not based on the parsing result, and an address notifying means that notifies a storage address of the content to the server device when the form determining means determines that the content includes a form. The server device includes a server's side content retrieving means that retrieves the content by accessing the notified storage address, an analyzing means that parses the retrieved content and analyzes context information of the content based on the parsing result, an input candidate determining means that determines input candidates based on the analyzing result, and a transmitting means that transmits the determined input candidates to the client device. The client device further includes a receiving means that receives the input candidates from the server device, and a displaying means that displays the received input candidates as the input candidates for the form.

Further, an input candidate providing program according to an embodiment of the invention is a program for letting a computer execute the input candidate providing method.

According to this type of program, suitable input candidates which are consistent with the context of the content to the form.

Further, an input candidate providing program according to an embodiment of the invention is a program for a computer, the computer is able to communicate with a server device so as to provide input candidates for a form embedded in a content to be displayed, and the server device outputs input candidates for the content based on context information of the content. The input candidate providing program is for letting the computer execute as a parsing means that parses a content, an analyzing means that analyzes a context of the content based on the parsing result, a client's side transmitting means that transmits the analyzing result and a request for obtaining input candidates to the server device, a client's side receiving means that receives the input candidates from the server device as a response to the request, and an input candidate displaying means that displays the received input candidates as the input candidates for the form.

Further, the input candidate providing program may be configured to further let the computer execute as, for example, an obtainment determining means that determines to obtain the input candidates from the server device or inside of the input candidate providing device, based on substance of the analyzing result of the analyzing means, and when it has been determined to obtain from the server device, the input candidate providing program lets the computer transmit the request for obtaining input candidates through the client's side transmitting means and receive the input candidates through the client's side receiving means as its response, and when it has been determined to obtain from inside of the input candidate providing device, the input candidate providing program lets the computer access a predetermined memory area inside of the input candidate providing device and obtain information stored in the memory area as the input candidates.

Further, the input candidate providing program can be configured to further let the computer execute as an input means that receives an input through a user operation, and to let the computer perform so that the parsing means starts executing a process of parsing the content at a time when the form is selected through the input which has been received by the input means.

Further, the input candidate providing program may be configured to, for example, let the computer perform so that the parsing means starts executing a process of parsing the content at a time when the content is retrieved by the client's side transmitting means and the client's side receiving means through communication with a content providing server which provides contents.

Further, an input candidate providing program according to an embodiment of the invention is a program for a computer, the computer is able to communicate with a server device so as to provide input candidates for a form embedded in a content to be displayed, and the server device outputs input candidates for the content based on a result of parsing of the content. The input candidate providing program is for letting the computer execute as a parsing means that parses a content, a client's side transmitting means that transmits the result of the parsing and a request for obtaining input candidates to the server device, a client's side receiving means that receives the input candidates from the server device as a response to the request, and an input candidate displaying means that displays the received input candidates as the input candidates for the form.

What is claimed is:

1. A method for providing input candidates with respect to a form which is embedded in a content to be displayed, the method comprising:
   a parsing result obtaining step of requesting and obtaining a result of parsing performed by a parsing function which parses a content;
   an analyzing step of passing the result of the parsing to an analyzing function which analyzes a context of the content, letting the analyzing function execute analysis, and obtaining a result of the analysis from the analyzing function;
   an input candidate determining step of passing the result of the analysis to an input candidate determining function which determines input candidates, letting the input candidate determining function determine the input candidates, and obtaining the input candidates from the input candidate determining function; and
   an input candidate displaying step of displaying the obtained input candidates on a display as the input candidates with respect to the form.

2. An input candidate providing device for providing input candidates with respect to a form embedded in a content to be displayed, the input candidate providing device comprising:
   a content retrieving unit that retrieves a content from inside or outside of the input candidate providing device;
   a parsing unit that parses the retrieved content;
   an analyzing unit that analyzes a context of the content based on the parsing result;
   a storing unit that stores information about input candidates which is obtained from an external device;

an input candidate determining unit that determines input candidates from the storing unit based on the analyzing result; and an input candidate displaying unit that displays the determined input candidates as the input candidates for the form.

3. The input candidate providing device according to claim 2, further comprising:

an extracting unit that extracts first information for analyzing from a first range in the content and second information for analyzing from a second range which is included in the first range by referring to the parsing result of the parsing unit, wherein the analyzing unit analyzes the content based on the extracted first information for analyzing and the extracted second information for analyzing.

4. The input candidate providing device according to claim 3, wherein the first range corresponds to the entirety of the content and the second range corresponds to a neighborhood of the form which is displayed on the content, and wherein the analyzing unit obtains a first class of context information based on the extracted first information for analyzing and a second class of context information, which belongs to the first class of context information, based on the extracted second information for analyzing.

5. The input candidate providing device according to claim 4, wherein the input candidate determining unit determines the input candidates from the storing unit based on the first and second classes of context information.

6. The input candidate providing device according to claim 2, further comprising:

an associating unit that associates the input candidates determined by the input candidate determining unit with the corresponding content, and stores the associated input candidates in a predetermined storage medium; and an input candidate reading-out unit that reads out the input candidates associated with the content to be displayed by referring to the predetermined storage medium, wherein the input candidate displaying unit displays the input candidates which have been read out.

7. The input candidate providing device according to claim 2, wherein when plural forms are embedded in the content, for the plural forms, the set of processes executed by the parsing unit, the analyzing unit, the input candidate determining unit, and the input candidate displaying unit are executed through batch processing.

8. An input candidate providing device which is able to communicate with a server device, the server device being able to output input candidates for a content based on context information of the content, the input candidate providing device comprising:

a content retrieving unit that retrieves a content from inside or outside of the input candidate providing device;

a parsing unit that parses the retrieved content;

an analyzing unit that analyzes a context of the content based on the parsing result;

a client's side transmitting unit that transmits a request for obtaining input candidates and the analyzing result to the server device;

a client's side receiving unit that receives the input candidates from the server device as a response to the request; and a displaying unit that displays the received input candidates as the input candidates for the form.

9. The input candidate providing device according to claim 8, further comprising:

an extracting unit that extracts first information for analyzing from a first range in the content and second information for analyzing from a second range included in the first range by referring to the parsing result of the parsing unit, wherein the analyzing unit analyzes the content based on the extracted first information for analyzing and the extracted second information for analyzing.

10. The input candidate providing device according to claim 9, wherein:

the first range corresponds to the entirety of the content and the second range corresponds to a neighborhood of the form which is displayed on the content; and the analyzing unit obtains a first class of context information based on the extracted first information for analyzing and second class of context information, which belongs to the first class, based on the extracted second information for analyzing.

11. The input candidate providing device according to claim 8, further comprising:

an obtainment determining unit that determines whether to obtain the input candidates from the server device or inside of the input candidate providing device, based on substance of the analyzing result of the analyzing unit, wherein:

when the obtainment determining unit has determined to obtain from the server device, the input candidate providing device transmits the request for obtaining input candidates through the client's side transmitting unit, and the input candidate providing device receives the input candidates as a response to the request through the client's side receiving unit; and when the obtainment determining unit has determined to obtain from inside of the input candidate providing device, the input candidate providing device accesses a predetermined memory area inside of the input candidate providing device and obtains information stored in the memory area as the input candidates.

12. The input candidate providing device according to claim 8, wherein the parsing unit starts executing a process of parsing the content at a time when the content is retrieved by the content retrieving unit through communicating with a content providing server which provides contents.

13. The input candidate providing device according to claim 8, further comprising:

a narrowing down unit that narrows down the input candidates, which have been received through the client's side receiving unit, based on a predetermined condition, wherein the input candidate displaying unit only displays the input candidates which have been narrowed down.

14. The input candidate providing device according to claim 8, further comprising:

an input unit that receives an input through a user operation, wherein the parsing unit starts executing a process of parsing the content at a time when the form is selected through the input which has been received by the input unit.

15. The input candidate providing device according to claim 8, wherein the analyzing unit receives plural pieces of context information, and, depending on a content of each piece of context information, the client's side transmitting unit transmits the piece of context information and a request for obtaining input candidates to a corresponding server device.

16. An input candidate providing device which is able to communicate with a server device, the server device outputting input candidates for a content based on a parsing result of the content, the input candidate providing device comprising:
   a content retrieving unit that retrieves a content from inside or outside of the input candidate providing device;
   a parsing unit that parses the retrieved content;
   a client's side transmitting unit that transmits a request for obtaining input candidates and the parsing result to the server device;
   a client's side receiving unit that receives the input candidates from the server device as a response to the request; and
   an input candidate displaying unit that displays the received input candidates as the input candidates for the form.

17. An input candidate providing system having the input candidate providing device according to claim 8 and a server device, the server device being able to communicate with the input candidate providing device, the server device comprising:
   a server's side receiving unit that receives an analyzing result of a content and a request for obtaining input candidates from the input candidate providing device;
   a storing unit that stores information about input candidates;
   an input candidate determining unit that determines input candidates from the storing unit based on the analyzing result, in accordance with the request; and
   a server's side transmitting unit that transmits the determined input candidates to the input candidate providing device as a response to the request.

18. The input candidate providing system according to claim 17, wherein the input candidate providing device further includes a weight giving unit which executes, when the analyzing unit obtains plural pieces of context information, a process of giving weights to the plural pieces of context information, respectively, based on the parsing result of the parsing unit, and the client's side transmitting unit transmits each weighted piece of context information to the server device,
   wherein the input candidate determining unit determines, for each piece of context information received through the server's side receiving unit, input candidates, the number of which corresponds to the respective result of weighting.

19. An input candidate providing system having the input candidate providing device according to claim 16 and a server device, the server device being able to communicate with the input candidate providing device, the server device comprising:
   a server's side receiving unit that receives a parsing result of a content and a request for obtaining input candidates from the input candidate providing device;
   an analyzing unit that analyzes a context of the content based on the parsing result, in accordance with the request;
   a storing unit that stores information about input candidates;
   an input candidate determining unit that determines input candidate from the storing unit based on the analyzing result; and
   a server's side transmitting unit that transmits the determined input candidates to the input candidate providing device as a response to the request.

20. The input candidate providing system according to claim 19, wherein the server device further includes a weight giving unit which executes, when the analyzing unit obtains plural pieces or context information, a process of giving weights to the plural pieces of context information, respectively, based on the parsing result of the parsing unit,
   wherein the input candidate determining unit determines, for each weighted piece of context information, input candidates, the number of which corresponds to the respective result of weighting.

21. The input candidate providing system according to claim 17, wherein the server device further includes
   a list generating unit that generates a list,
   wherein the list generating unit generates a list in which plural input candidates are listed in a predetermined order, when the plural input candidates are determined by the input candidate determining unit.

22. The input candidate providing system according to claim 19, wherein the server device further includes a list generating unit that generates a list,
   wherein the list generating unit generates a list in which plural input candidates are listed in a predetermined order, when the plural input candidates are determined by the input candidate determining unit.

23. An input candidate providing system in which a client device and a server device cooperate to provide input candidates for a form embedded in a content, the client device and the server device being able to communicate with each other,
   the client device comprising:
   a client's side content retrieving unit that retrieves a content from inside or outside of the client device;
   a parsing unit that parses the retrieved content;
   a form determining unit that determines whether the content includes a form or not based on the parsing result; and
   an address notifying unit that notifies a storage address of the content to the server device when the form determining unit determines that the content includes a form,
   the server device comprising:
   a server's side content retrieving unit that retrieves the content by accessing the notified storage address;
   an analyzing unit that parses the retrieved content and analyzes context information of the content based on the parsing result;
   an input candidate determining unit that determines input candidates based on the analyzing result; and
   a transmitting unit that transmits the determined input candidates to the client device; and
   the client device further comprising:
   a receiving unit that receives the input candidates from the server device; and
   a displaying unit that displays the received input candidates as the input candidates for the form.

24. A computer-readable storage medium having computer readable instructions stored thereon, which, when executed by a processor of a computer, configures the processor to function as:
   a parsing unit that parses a content;
   an analyzing unit that analyzes a context of the content based on the parsing result;
   a client's side transmitting unit that transmits the analyzing result and a request for obtaining input candidates to the server device;

a client's side receiving unit that receives the input candidates from the server device as a response to the request; and an input candidate displaying unit that displays the received input candidates as the input candidates for the form.

25. The computer-readable storage medium according to claim 24, wherein the instructions further configures the processor to function as:

an obtainment determining unit that determines to obtain the input candidates from the server device or inside of the input candidate providing device, based on substance of the analyzing result of the analyzing unit, wherein, when it has been determined to obtain from the server device, the request for obtaining input candidates is transmitted through the client's side transmitting unit and receive the input candidates is received through the client's side receiving unit as its response, and when it has been determined to obtain from inside of the input candidate providing device, a predetermined memory area inside of the input candidate providing device is accessed and information stored in the memory area is obtained as the input candidates.

26. The computer-readable storage medium according to claim 24, wherein the instructions further configures the processor to function as an input unit that receives an input through a user operation, wherein the parsing unit starts executing a process of parsing the content at a time when the form is selected through the input which has been received by the input unit.

27. The computer-readable storage medium according to claim 24, wherein parsing unit starts executing a process of parsing the content at a time when the content is retrieved by the client's side transmitting unit and the client's side receiving unit through communication with a content providing server which provides contents.

28. A computer-readable storage medium having computer-readable instructions stored thereon, which, when executed by a processor of a computer, configures the processor to function as:

a parsing unit that parses a content;

a client's side transmitting unit that transmits the result of the parsing and a request for obtaining input candidates to the server device;

a client's side receiving unit that receives the input candidates from the server device as a response to the request; and an input candidate displaying unit that displays the received input candidates as the input candidates for the form.

29. A computer-readable storage medium having computer-readable instructions stored thereon, which, when executed by a processor of a device, configures the processor to perform:

a parsing result obtaining step of requesting and obtaining a result of parsing performed by a parsing function which parses a content;

an analyzing step of passing the result of the parsing to an analyzing function which analyzes a context of the content, letting the analyzing function execute analysis, and obtaining a result of the analysis from the analyzing function;

an input candidate determining step of passing the result of the analysis to an input candidate determining function which determines input candidates, letting the input candidate determining function determine the input candidates, and obtaining the input candidates from the input candidate determining function; and an input candidate displaying step of displaying the obtained input candidates on a display as the input candidates with respect to the form.

\* \* \* \* \*